(12) United States Patent
Kasamatsu

(10) Patent No.: US 11,714,982 B2
(45) Date of Patent: Aug. 1, 2023

(54) PRINTING DEVICE, PRINT PROCESSING SYSTEM, AND PRINT PROCESSING METHOD

(71) Applicant: BROTHER KOGYO KABUSHIKI KAISHA, Nagoya (JP)

(72) Inventor: Daisuke Kasamatsu, Chita (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/725,697

(22) Filed: Apr. 21, 2022

(65) Prior Publication Data
US 2022/0351012 A1   Nov. 3, 2022

(30) Foreign Application Priority Data
Apr. 28, 2021  (JP) .................................. 2021-075825

(51) Int. Cl.
*G06K 15/00* (2006.01)

(52) U.S. Cl.
CPC .............................. *G06K 15/4075* (2013.01)

(58) Field of Classification Search
CPC ............. G06K 15/4075; G06K 15/407; G06K 15/402; B41J 2/17523; B41J 2/17566; B41J 2/1752; B41J 2002/17573
See application file for complete search history.

(56) References Cited

U.S. PATENT DOCUMENTS

| | | | |
|---|---|---|---|
| 2001/0037267 A1* | 11/2001 | Sato | G06Q 10/0875 705/29 |
| 2006/0071952 A1* | 4/2006 | Motominami | B41J 3/46 347/5 |
| 2006/0228123 A1 | 10/2006 | Zaima | |
| 2017/0090830 A1* | 3/2017 | Tomono | G06F 3/1219 |
| 2018/0213115 A1 | 7/2018 | Sun et al. | |

FOREIGN PATENT DOCUMENTS

| | | |
|---|---|---|
| JP | 2006292830 A | 10/2006 |
| JP | 2016194906 A | 11/2016 |
| JP | 2017037596 A | 2/2017 |
| JP | 2018118406 A | 8/2018 |

\* cited by examiner

*Primary Examiner* — Iriana Cruz
(74) *Attorney, Agent, or Firm* — Scully, Scott, Murphy & Presser, PC

(57) ABSTRACT

A printing device includes a mounting part to which consumables to be used for printing is mounted, a print engine configured to print an image on a recording medium using the consumables, a display configured to display information regarding the consumables, and a controller. The printing device is operable based on a concluded contract with a contractor for the consumables used for printing. The controller is configured to perform obtaining arrival time information of a first consumable, determining a model of the consumables, and displaying consumable handling related information on the display based on the arrival time information and a determining result.

17 Claims, 9 Drawing Sheets

PRINTING DEVICE, PRINT PROCESSING SYSTEM, AND PRINT PROCESSING METHOD

CROSS-REFERENCE TO RELATED APPLICATIONS

This application claims priority under 35 U.S.C. § 119 from Japanese Patent Application No. 2021-075825 filed on Apr. 28, 2021. The entire subject matter of the application is incorporated herein by reference.

BACKGROUND

The present disclosures relate to a printing device configured to perform printing on a printing medium using consumables, a print processing system employing such a printing device, and a print processing method for such a printing device.

Conventionally, there has been known a technology in which a particular contract is concluded with a user of a printing device, and based on the contract, a billing is charged to the user according to printing contents.

When a contract is concluded as described above, as consumables such as cartridges used in the printing device, specific consumables corresponding to the contract (hereinafter referred to as "contract consumables"), which are different from commercially available consumables, are used. Therefore, it is desirable to identify a model of the consumable installed in the printing device, and if, for example, a commercial consumable is installed instead of the contracted consumable after the contract has been concluded, a warning message to that effect may be displayed.

SUMMARY

It is noted that, after the conclusion of the contract, the contracted consumables are usually delivered to the user from a particular delivery source, for example, but depending on the circumstances on the user's side, the user may want to perform printing before the delivery arrives. In such a case, however, it is not appropriate to always display a warning message when the commercially available consumables are installed to the printing device as described above, because the only way to fulfill the necessity is to use the commercially available consumables.

If the contracted consumables are delivered and arrived while the commercial consumables are unavoidably being used as described above, it is more beneficial to the user, for example, in terms of the cost burden, to replace them with the contracted consumables instead of the commercial consumables. However, some users may want to use up the commercially available consumables as they are, due to the time and effort required for replacement or other reasons. Accordingly, it is preferable to provide an inquiring screen for asking the user's intention.

As described above, when the contract has been concluded with the user, it is more convenient for the user if the printing device provides appropriate indications according to the model of consumables installed and the delivery status of the contracted consumables. In the conventional technology described above, no special consideration is given in this regard.

According to aspects of the present disclosure, there is provided a printing device including a mounting part to which consumables to be used for printing is mounted, a print engine configured to print an image on a recording medium using the consumables, a display configured to display information regarding the consumables, and a controller. The printing device is operable based on a concluded contract with a contractor for the consumables used for printing. The controller is configured to perform first obtaining arrival time information of a first consumable delivered to the printing device based on the concluded content, first determining a model of the consumables mounted to the mounting part, and first displaying consumable handling related information on the display based on the arrival time information obtained in the first obtaining and a determining result in the first determining.

BRIEF DESCRIPTION OF THE DRAWINGS

FIG. 8 shows an example of particular information to be displayed on the display of the MFP.

DETAILED DESCRIPTION

Hereinafter, aspects of the present disclosures will be described, referring to the accompanying drawings.

A print processing system 1 will be described, referring to FIG. 1. The print processing system 1 is configured to provide a delivery service based on a delivery contract according to which replacement consumables are automatically delivered when the consumables used in an MFP (multi-function peripheral) 200 are consumed to a certain degree. The print processing system 1 is also configured to provide a printing service based on a printing contract according to which a fee is billed based on the number of sheets printed in the MFP 200.

Overview of Print Processing System

Figure 1:
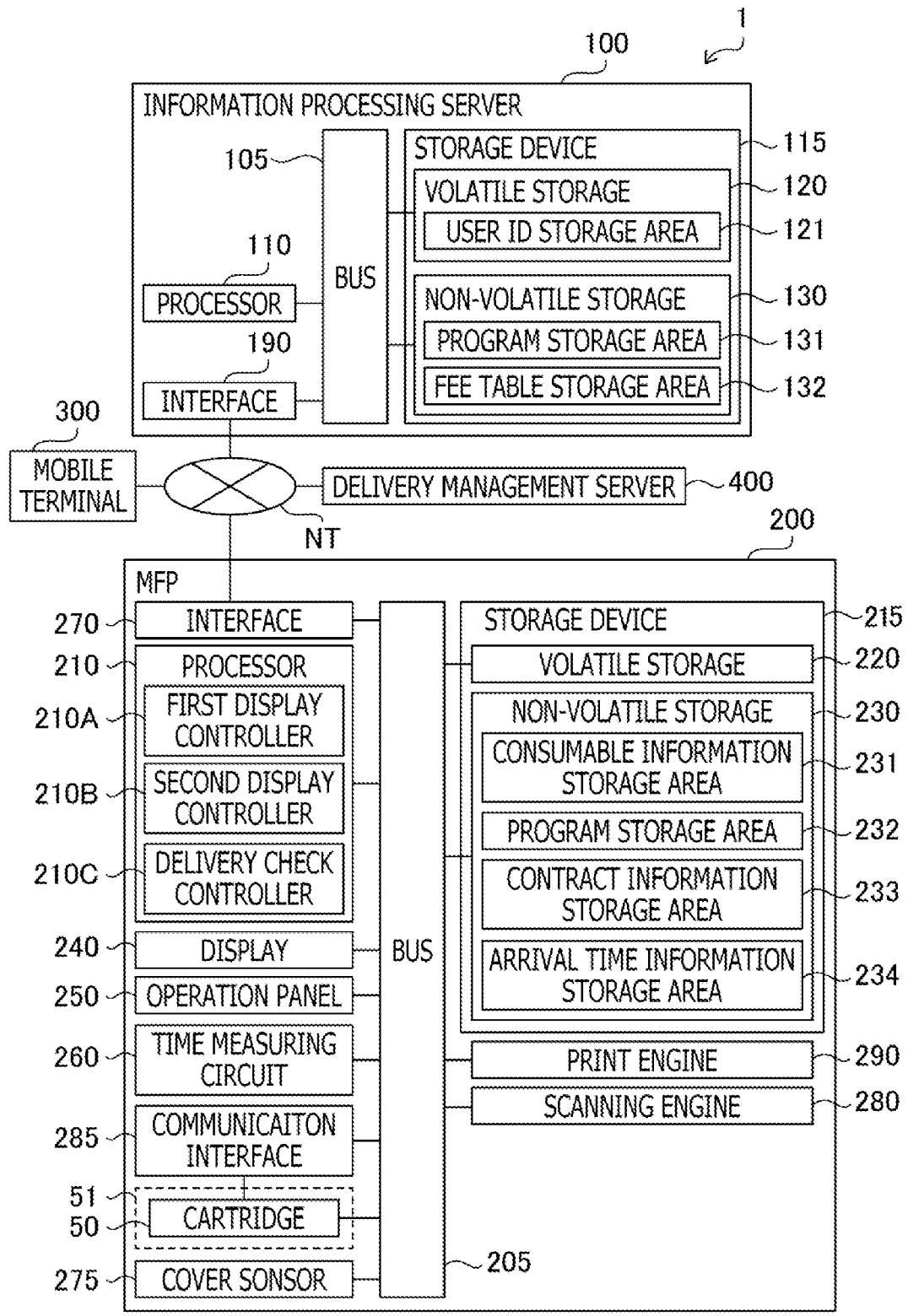
FIG. 1 is a block diagram showing a functional configuration of an entire print processing system according to an embodiment.

As shown in FIG. 1, the print processing system 1 includes an information management server 100, an MFP 200, a mobile terminal 300, and a delivery management server 400. The information management server 100, the MFP 200, the mobile terminal 300, and the delivery management server 400 are connected to a network NT so as to communicate with each other. It is noted that the MFP 200 is an example of a printing device, and the information management server 100 or the mobile terminal 300 is an example of an external device.

Information Management Server

The information management server 100 is a server installed and managed, for example, by a manufacturer of the MFP 200, and has a processor 110, a storage device 115, and an interface 190. The processor 110, the storage device 115 and the interface 190 are interconnected via a bus 105.

The storage device 115 is provided with a volatile storage 120 and a non-volatile storage 130. The volatile storage 120 is, for example, a DRAM and has a user ID storage area 121. ID storage area 121. The non-volatile storage 130 is, for example, a hard disk drive or a solid-state drive, and has a program storage area 131 and a fee table storage area 132. In the fee table storage area 132, for example, particular correlation relationships are stored for calculating the fees charged to the user for printing and for ink cartridge delivery.

The processor 110 is a device configured to perform data processing, and is, for example, a CPU. By executing the program stored in the program storage area 131, the processor 110 executes various processes shown in FIGS. 2, 3, 4, 6, and 7, including data communication with the mobile terminal 300, the MFP 200, and the delivery management server 400 connected to the network NT.

The interface 190 is a wired LAN interface or wireless interface for communicating with other devices, and is connected to the network NT.

Delivery Management Server

The delivery management server 400 is installed, for example, in a delivery service company that provides delivery services for various goods, and has a processor, a storage device, and an interface for connecting to the network NT (not shown).

MFP

The MFP 200 is owned, for example, by a business operator that provides the above printing services. The MFP 200 may be personally owned by the user who uses the same. The MFP 200 has a scanner engine 280, a print engine 290, a controller 210, a storage device 215, a display 240, an operation panel 250, a timing measurement circuit 260, a communication interface 285, a communication interface 270, and a cover sensor 275, which are interconnected via a bus 205.

The storage device 215 includes a volatile storage 220 and a non-volatile storage 230. The volatile storage 220 is, for example, a DRAM. The non-volatile storage 230 is, for example, a flash memory. The non-volatile storage 230 has a consumable-related information storage area 231 that stores consumable information related to ink cartridges 50, a program storage area 232, a contract information storage area 233 that stores the details of the conclusion of the contract that the user has made with a contractor, and an arrival time information storage area 234 that stores arrival time information representing scheduled arrival date and time when the contract cartridges 50 are delivered and arrive or arrival completion date and time when they arrive. The arrival time information storage area 234 is an example of a storage. Various programs are stored in the program storage area 232, and the various programs include an operation program of the MFP 200, including a print processing program, which is related to the execution of a print processing method according to aspects of the present disclosures based on the sequence diagram and flowcharts shown in FIGS. 2, 3, 4, 6, 7, which will be described below. This print processing program may be stored in advance in the program storage area 232 as firmware. In addition, information about printing operations based on contract contents described below is also stored as part of the print processing program.

The controller 210 is a device configured to perform data processing and is, for example, a CPU. It is noted that the controller 210 is an example of a controller. The controller 210 executes the print processing program stored in the program storage area 232, and executes the print processing method by the print processing system 1 in cooperation with the processor 110. As shown in FIG. 1, the controller 210 has a first display controller 210A, a second display controller 210B, and a delivery checking controller 210C, which will be described later.

The display 240 is, for example, an LCD and is configured to display various pieces of information regarding the consumables as will be described later. The operation panel 250 is a device configured to receive operations by the user. By operating the operation panel 250, the user can input various instructions to the MFP 200. The communication interface 270 is a wired or wireless network interface and is connected to a network NT.

The scanner engine 280 is configured to read an original document, which is an object to be read, optically using a photoelectric conversion element such as a CCD or a CMOS, and generates scan data representing the read image.

The print engine 290 is configured to use a conveying mechanism (not shown) to pick up and convey the recording sheets accommodated in a sheet feed tray one by one, and print an image on the conveyed sheet using a particular printing method. In the following description, an example in which the printing is performed in accordance with an inkjet method will be described as an example. The print engine 290 is configured to form an image on the sheet using ink stored in ink cartridges 50 which is detachably attached to a cartridge holder 51 in accordance with a print job transmitted from the mobile terminal 300 or generated based on the user operation of the operation panel 250. It is noted that the sheet is an example of a printing medium, the ink cartridge 50 is an example of a consumable, and the cartridge holder 51 is an example of a mounting part. Specifically, the ink cartridges 50 include a cyan ink cartridge 50, a magenta ink cartridge 50, a yellow ink cartridge 50, and a black ink cartridge 50. However, in the following description, for the sake of convenience, unless otherwise specified, they are simply referred to as "ink cartridges 50" without distinguishing the colors thereof.

The communication interface 285 includes, for example, electrical terminals and are electrically connected to a cartridge memory (e.g., an IC chip) owned by the ink cartridge installed in the cartridge holder 51. As mentioned above, the MFP 200 according to the present embodiment is a model that can be used in a delivery service based on a particular delivery contract, and can also be used in a printing service based on another particular printing contract. The ink cartridges 50 which is used based on the above-described contract (hereinafter referred to simply as "contract cartridges 50" as appropriate) have different specifications from normal ink cartridges 50 that are commercially available cartridges the owner of the MFP 200 can purchase and use (hereinafter referred to simply as "normal cartridges 50" as appropriate). The contract cartridge 50 is an example of a first consumable, and the normal cartridge 50 is an example of a second consumable. It is noted that an imitated ink cartridge 50 that illegally imitates the normal cartridge 50 is also an example of the second consumable.

Each ink cartridge 50 is provided with a cartridge memory (not shown), in which cartridge information is stored. The cartridge information includes cartridge model information indicating whether the cartridge 50, to which the cartridge memory is attached, is the contract cartridge 50 or the normal cartridge 50. The controller 210 obtains the cartridge information from the cartridge memory of each ink cartridge 50 to which the controller 210 is connected via the communication interface 285. In this way, the controller 210 can identify whether the ink cartridge 50 installed in the cartridge holder 51 is the contract cartridge 50 or the normal cartridge 50 based on the results of the obtaining. The cartridge holder 51 has an openable cover (not shown) that can be opened and closed when the ink cartridge 50 is installed to or removed from the cartridge holder 51, and the cover is closed after installation or removal. The open and closed states of the openable cover are detected by a cover sensor 275 using a well-known method, and the corresponding detection signals are input to the controller 210.

At this time, in the MFP 200, the remaining amount of the ink or the used amount of the ink in the ink cartridge 50 installed to the cartridge holder 51 is obtained by the controller 210 using a well-known method. Then, when the remaining amount of the ink reaches the predetermined remaining amount threshold, or when the ink usage increases and reaches the predetermined usage threshold, the display 240 indicates that the ink cartridge 50 should be replaced. In this way, convenience is provided for the user when replacing the ink cartridge 50. The remaining amount of the ink and the used amount of ink are collectively referred to as the "usable amount" hereinafter.

The timing measurement circuit 260 is, for example, a circuit such as RTC (Real Time Clock), which functions as an internal clock to measure the time. This timing measurement circuit 260 is driven by driving power supplied from a power supply circuit (not shown), and current time information measured by the timing measurement circuit 260 can be referenced by the controller 210 at any time. It is noted that the controller 210 may obtain the current time information from an SNTP (Simple Network Time Protocol) server (not shown) on the network NT via the communication interface 270 instead of the timing measurement circuit 260.

Alternatively, the current time information measured by the timing measurement circuit 260 may be calibrated in accordance with the time information from the SNTP server or the time information obtained from the mobile terminal 300. In particular, when the power supply of the MFP 200 is turned off and no drive power is supplied from the power supply circuit, the current time information in the timing measurement circuit 260 may be calibrated at any time using time information from the SNTP server or the like. Furthermore, in such a case, time information from the SNTP server or information management server 100 may be forcibly injected into the timing measurement circuit 260 and used as current time information.

Mobile Terminal

Figure 2:
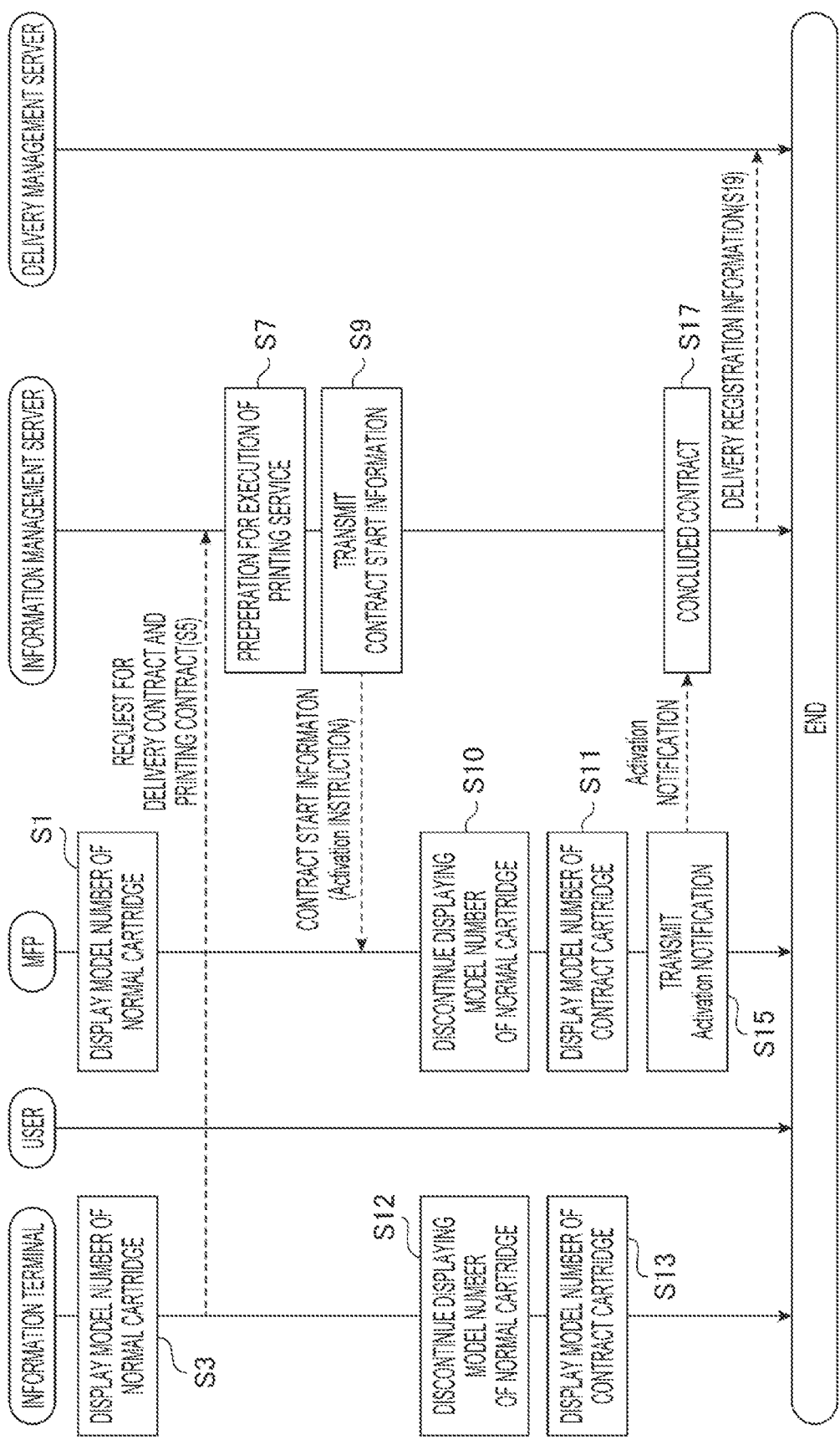
FIG. 2 is a sequence diagram illustrating a contract concluding process performed by an information terminal device, an MFP (multi-function peripheral), an information management server, and a delivery server.

The mobile terminal 300 is, for example, a smartphone of the user or the like, which is connected to the network NT via wireless communication. The mobile terminal 300 has a processor, a storage device, an interface to connect to the network NT, and a suitable display device (not shown). Various programs are stored in the program storage area of the storage device, and the various programs include a processing program for executing a sequence flow as shown in FIG. 2. It is noted that other information terminals, such as a personal computer, a tablet computer, or the like may be used in place of the mobile terminal 300. Such an information terminal is hereinafter collectively referred to simply as an "information terminal 300."

Features of Embodiment

In the above-described configuration, one of features of the present embodiment is that consumable handling information (described later) is displayed on the display 240 according to the delivery status of the ink cartridge 50 after the delivery contract is concluded and the model of the ink cartridge 50 installed in the cartridge holder 51.

After the delivery contract is concluded, the contracted cartridge 50 will be delivered from a particular delivery source to the user under management of the delivery management server 400. It is noted, however, depending on circumstances on the user side, the user may wish to perform printing before the ink cartridge 50 as delivered arrive the user. In such a case, since there is no choice but to use the commercially available normal cartridge 50, it is necessary to allow installation of the normal cartridge 50 to the cartridge holder 51 even after the conclusion of the contract, and the display of warning messages or the like should be avoided.

When the contracted cartridge 50 is delivered and arrived or is expected to arrive while the normal cartridge 50 is being used due to unavoidable circumstances as described above, it would be indicated to the user so that the user can replace the commercial cartridge 50 with the contract cartridge 50. It would be more beneficial to the user in terms of a cost burden to stop using the commercial cartridge 50 and replace the same after the contract cartridge 50 arrives. Some users may want to use up their existing cartridges even when the contract cartridges arrive, due to the time and effort required to replace them or for other reasons. In such cases, it is preferable to display a message asking the user's intentions.

Flow of Processes

Referring to FIGS. 2-7, processes performed according to the present embodiment will be described.

At a Time of Concluding Contract

Firstly, a process when the delivery contract is concluded, which is performed by the controller 210 of the MFP 200, the processor 110 of the information management server 100 and a processor of the information terminal 300 will be described with reference to a sequence diagram shown in FIG. 2. It is noted that, in the following explanation, description of the respective "processors" is omitted and processes performed by respective processors (e.g., "an operation performed by a processor of the MFP 200") will be described in a simplified manner (e.g., "an operation performed by the MFP 200").

In FIG. 2, first, in the MFP 200, as the user performs an appropriate operation via the operation panel 250, a model number of a normal cartridge 50 compatible with the MFP 200 is displayed on the display 240 based on the content stored in the consumable-related information storage area 231 described above (S1). At this point, the printing contract described below has not been concluded, and the cartridge holder 51 usually has the normal cartridges 50 installed, or no cartridges 50 installed at all.

In the information terminal 300, the model numbers (not shown) of the cartridges 50 of the black ink, cyan ink, magenta ink, and yellow ink, respectively, obtained from the MFP 200 are displayed (S3) in conjunction with the process of S1 as the user performs appropriate operations via the operation panel 250.

Thereafter, as the user performs appropriate operations at the information terminal 300 with the intention of using the MFP 200 based on the delivery contract and the printing contract described above, a delivery contract request and a printing contract request are sent from the information terminal 300 and received by the information management server 100 (S5).

Correspondingly, the information management server 100 makes particular preparations for executing the printing service based on the above printing contract, for example, preparations for counting the number of printed sheets.

Thereafter, contract start information, i.e., an activation instruction, is sent from the information management server 100, which is received by the MFP 200 (S9). With this, both the delivery contract and printing contract are now in concluded states. The MFP 200 writes, by flagging or otherwise, in the contract information storage area 233 that the MFP 200 itself has become in the contract start state based on the receipt of the activation instruction. As the activation is executed, it becomes possible that the MFP 200 performs printing operations based on the concluded contract.

The flag and/or other information stored in the contract information storage area 233 at this time is an example of information corresponding to the "content of the concluded contract" according to aspects of the present disclosures, and the printing operation of the MFP based on the presence or absence of the flag is an example of the "operation based on the content of the concluded contract. The controller 210 of the MFP 200 can perform processing such as accessing consumable-related information, including consumable handling-related information described below, stored in the consumable-related information storage area 231 of the storage device 215 according to the presence or absence of the flag, and displaying the same on the display 240, as the "operation based on the content of the contract." As an alternative, information corresponding to the "content of the concluded contract" may be stored in the consumable-related information storage area 231 as information about the content of the original concluded contract itself.

Thereafter, in the MFP 200, the display of the model number of the normal cartridge 50 started in S1 is discontinued under the control of the controller 210 in response to the conclusion of the printing contract. In other words, the model number of the normal cartridge 50 will no longer be displayed (S10). Then, based on the storage content of the consumable-related information storage area 231 described above, the model number of the contract cartridge 50 that is suitable for the MFP 200 is newly displayed on the display 240 (S11).

In addition, in the information terminal 300, corresponding to the conclusion of the contract, and in conjunction with the process of S11, the display of the model number of the normal cartridge 50 started in S3 is discontinued. That is, the model number of the normal cartridge 50 is no more displayed (S12). Then, as above, the model number of the contract cartridge 50 that is suitable for the MFP 200 is newly displayed (S13).

After that, a contract acknowledgment notice, or activation notice, is sent from the MFP 200 (S15), which is received by the information management server 100 (S17). It is also possible that the information management server 100 is configured to send an inquiry to the MFP 200, and the MFP 200 is configured to send the activation notice as a response. In this way, the information management server 100 recognizes that the printing contract has been concluded. Thereafter, the MFP 200 communicates with the information management server 100 periodically to exchange information about the contract.

Thereafter, delivery registration information informing the delivery of the contract cartridge 50 to the user is sent from the information management server 100 to the delivery management server 4000 (S19). In this way, the registration arrangement for the delivery of contracted cartridges 50 from the delivery service company to the user is completed.

Process when MFP is powered ON or Print Job is Completed . . . (1)

Figure 3:
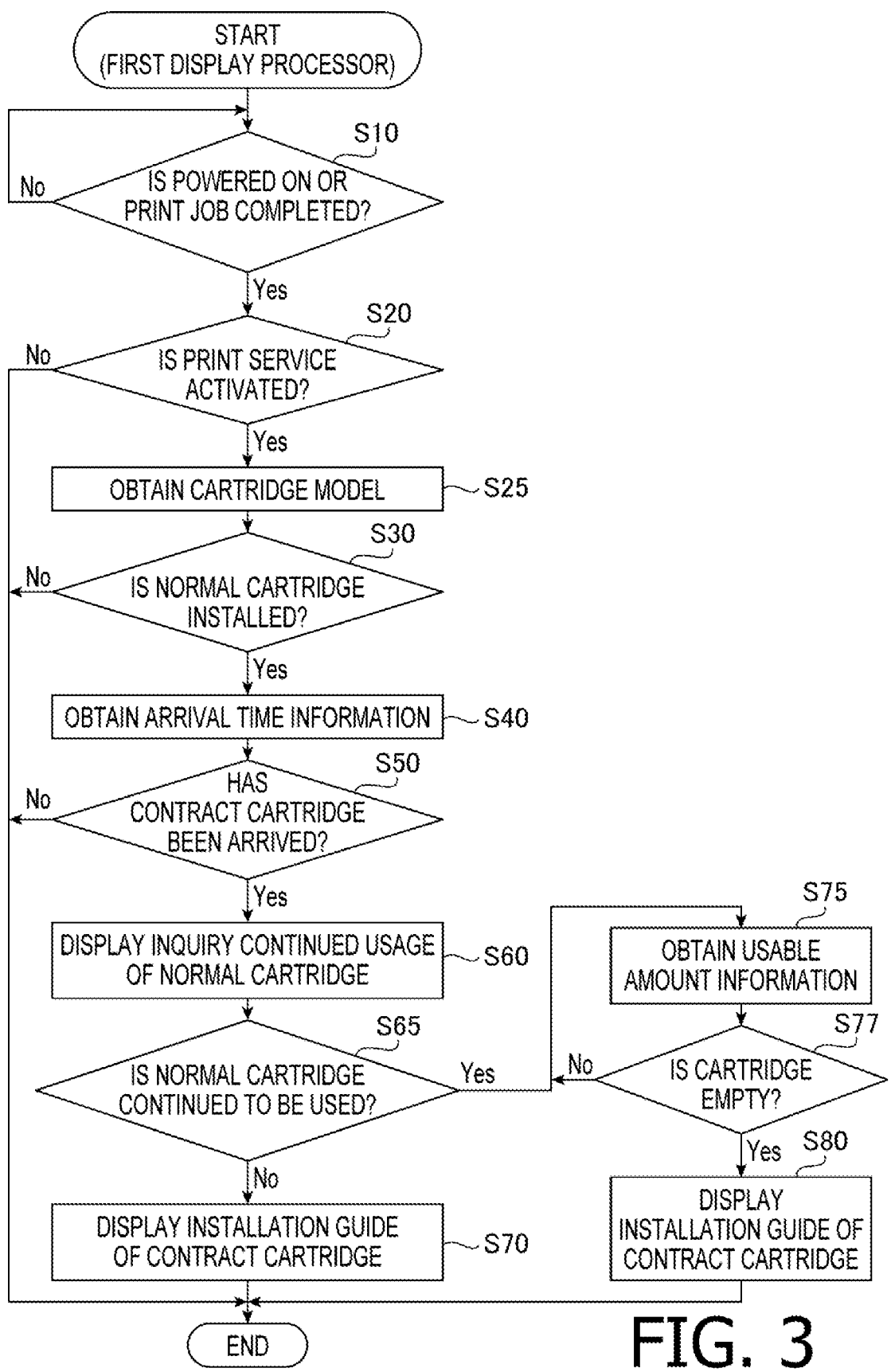
FIG. 3 is a flowchart illustrating a process performed by a first display controller of a processor provided to the MFP.

As an example of a case in which consumable handling information is displayed, an example of a process performed by the first display controller 210A of the controller 210 when the MFP 200 is powered on or when execution of one print job by the print engine 290 is completed is described referring to a flowchart shown in FIG. 3.

First, when the MFP 200 is powered on or a print job is completed (S10: YES), it is determined whether or not the MFP 200 is in the contract start state (i.e., in the Activated state) due to the conclusion of a contract as described above referring to FIG. 2 (S20). When the state is not "Activate" (S10: NO), the process shown in FIG. 3 is terminated.

When the MFP 200 is in the Activated state (S20: YES), cartridge mode information of the ink cartridge 50 installed to the cartridge holder 51 is obtained (S25). The process executed in S25 by the first display controller 210A is an example of a second obtaining process.

Then, based on the cartridge model information obtained in S25, it is determined whether or not a normal cartridge 50 is installed in the cartridge holder 51 (S30). If a cartridge other than the normal cartridge 50 is installed (S30: NO), the process shown in FIG. 3 is terminated. A process in S30 is an example of a determining, a process executed by the first display controller 210A in S30 is an example of a first determining process, and the first display controller 210A that executes S30 is an example of a determining part.

When the normal cartridge 50 is installed (S30: YES), arrival time information of the contract cartridge 50, which is stored in an arrival time information storage area 234 at this point, is read and obtained (S40). When the contract cartridge 50 has already arrived at the user, the arrival time information indicating the arrival date and time and the information to the effect of "arrived" are obtained. When the contract cartridge 50 has not yet arrived after shipment and is still under-delivery or has not yet been shipped, the arrival time information indicating the expected arrival date and time is obtained. It is noted that S40 is an example of an obtaining, a process executed by the first display controller 210A in S40 is an example of a first obtaining, and the first display controller 210A that executes S40 is an example of an obtaining.

Process by Delivery Checking Processor

The storing of the arrival time information in the arrival time information storage area 234 described above is performed by the delivery checking controller 210C of the controller 210. The process executed by the delivery checking controller 210C is described with reference to FIG. 4. The processes shown in FIG. 3 and FIG. 4 are executed concurrently using a well-known method similar to "multitasking," which is often used, for example, in computer operating systems.

Figure 4:
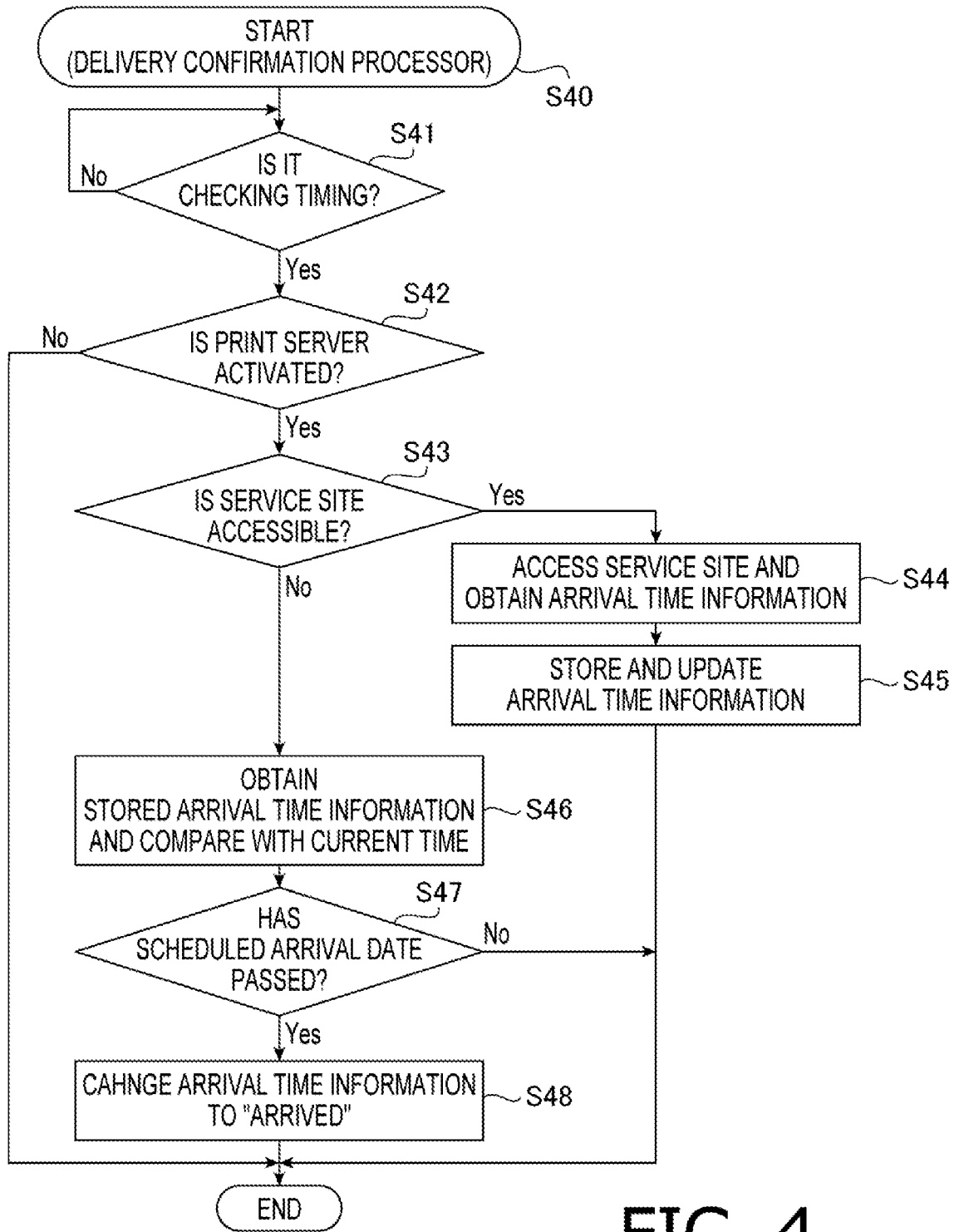
FIG. 4 is a flowchart illustrating a process performed by a delivery checking processor of the processor provided to the MFP.

In FIG. 4, first, in S41, it is determined whether or not the particular checking timing has come. In other words, the current time represented by current time information of the timing measurement circuit 260 is compared with the predetermined checking timing to determine whether the current time is the same as the checking timing or whether the current time has passed the checking timing. Examples of the checking timing may be a power-on timing of the MFP 200, an opening operation timing of an openable cover detected by the cover sensor 275, a completion timing of a print job by the print engine 290, and the like. Alternatively, the dates and times when the arrival time information is stored periodically in the arrival time information storage area 234 may be individually defined as the checking timings, in advance, or the checking timing may be defined to store the arrival time information at every predetermined cycle.

When the current time is the same as the checking timing or the current time has passed the checking timing (S41: YES), and whether or not the MFP 200 is in the contract start state (i.e., Activated state) due to the conclusion of a contract is determined (S42) as in S20. When the MFP 200 is not in the Activated state (S42: NO), the process is terminated. When the MFP 200 is in the Activated state (S42: YES), it is determined whether or not the service site of the delivery service company provided by the delivery management server 400 is accessible (S43).

When it is determined that the service site is accessible (S44: YES), the delivery checking controller 210C accesses the service site to obtain the arrival time information of the corresponding contract cartridge 50 (S44). In this case, the delivery checking controller 210C may obtain the information from the service site through the delivery management server 400 via the network NT, or the delivery checking controller 210C may obtain the information directly from the above service site based on the URL. Thereafter, the arrival time information obtained in S44 is stored in the arrival time information storage area 234, the content of the arrival time information stored in the arrival time information storage area 234 is updated (S45), and the process is terminated. The process performed by the delivery confirmation processor in S45 is an example of an update process.

On the other hand, when the service site is not accessible (S43: NO), and the latest arrival time information stored in the arrival time information storage area 234 at this point is obtained and compared with the current time represented by the current time information by the timing measurement circuit 260 (S46). When the current time has not passed the scheduled arrival date represented by the arrival time information (S47: NO), and this flow is terminated. When the current time has passed the scheduled arrival date represented by the arrival time information (S47: YES), the content of the arrival time information stored in the arrival time information storage area 234 is changed to "arrived" (S48), and the process is terminated.

Process when MFP is Powered ON or Print Job is Completed . . . (2)

Returning to FIG. 3, once the arrival time information stored in the arrival time information storage area 234 by the delivery checking controller 210C as described above is obtained in S40, it is determined whether or not the contract cartridge 50 has arrived based on the arrival time information (S50). That is, the current time represented by the current time information of the timing measurement circuit 260 is compared with the scheduled arrival date and time or arrival completion date and time represented by the arrival time information obtained in S40 (hereinafter simply referred to as the "arrival date and time") to determine whether or not the current time is the same as or past the arrival date and time. The arrival date and time is an example of an arrival time, and determining whether or not the current time is the same as the arrival date and time or has passed the arrival date and time is an example of determining the arrival time, and the process executed by the first display controller 210A in S50 is an example of a second determination process. Instead of determining the arrival of the contracted cartridges 50 based on whether or not the current time is the same as or past the arrival date and time, the arrival of the contracted cartridges 50 may be determined based only on whether or not the contracted cartridges 50 have already arrived and information to the effect that they have "arrived" is stored in the arrival time information storage area 234. When the contract cartridge 50 has not arrived (S50: NO), and the process is terminated.

Figure 5A:
FIGS. 5A-5D show examples of screens displayed on a display of the MFP.

If the contract cartridge 50 has arrived (S50: YES), a message inquiring the user whether to continue using the normal cartridge 50 in its current state is displayed on the display 240 (S60). FIG. 5A shows an example of an inquiry screen 240A displayed on the display 240 at this time. The content displayed on this inquiry screen 240A is an example of usage checking information and also an example of consumable handling related information. Further, S60 is an example of display, and the process executed by the first display controller 210A in S60 is an example of the first display controller.

Figure 5B:
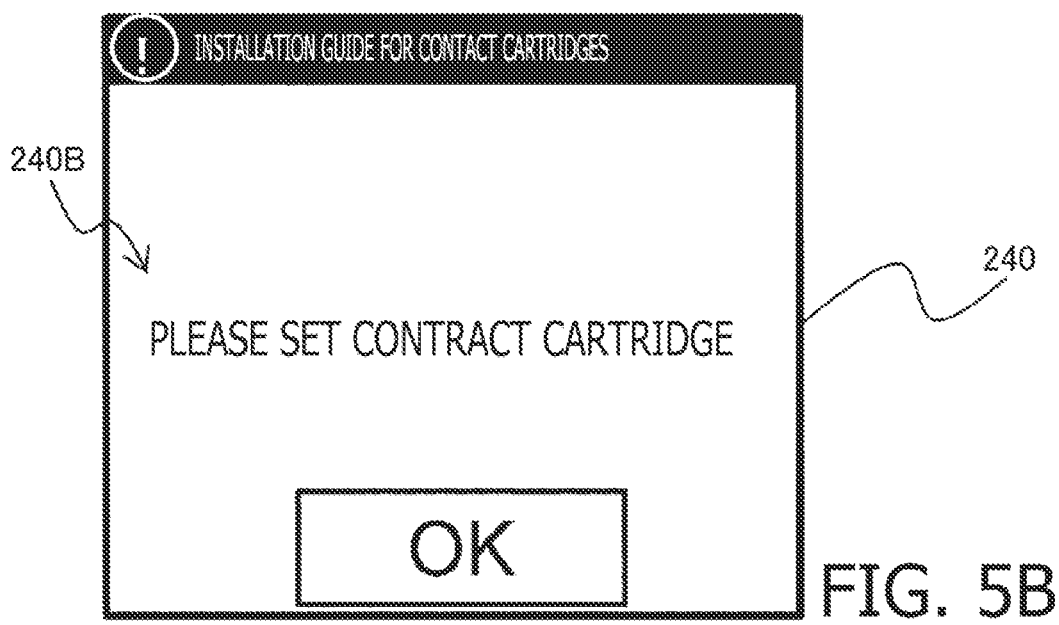

For example, when a "No" button on the inquiry screen 240A is operated by the operation of the operation panel 250 of the MFP 200 (S65: NO), and a guidance display is made on the display 240 to install the contract cartridge 50 (S70). FIG. 5B shows a guidance screen 240B displayed on the display 240 at this time. The indication of the user's intention by the operation of the "No" button on the inquiry screen 240A is an example of information to deny the continued use of the input consumables. The content displayed on the guidance screen 240B is an example of information recommending replacement with the first consumable and is also an example of information related to handling consumables. S70 is also an example of displaying, and the process executed by the first display controller 21A in S70 is also an example of displaying. The first display controller 210A that executes S70 is also an example of a display controller. After the execution of S70, the process is terminated.

On the other hand, for example, if the "Yes" button of the inquiry screen 240A is operated by operating the operation panel 250 of the MFP 200 (S65: YES), at a particular timing thereafter, the usable amount information representing the usable amount of the ink stored in the normal cartridge 50 installed in the cartridge holder 51 at that time is obtained by a known method as described above (S75). The indication of the user's intention by operating the "No" button on the inquiry screen 240A is an example of input information to allow continued use, and the process executed by the first display controller 210A in S75 is an example of a third acquisition process.

When the usable amount represented by the obtained usable amount information reaches the particular threshold corresponding to an Empty state, which is the state of lack of remaining ink (S77: YES), the display 240 indicates that the contract cartridge 50 should be installed (S80) as in S70 above. The contents of the display 240, in this case, are the same as those in FIG. 5B above. In this case, the content displayed on the guidance screen 240B is also an example of information recommending replacement with the first consumable, and is also an example of information related to handling the consumable. S80 is also an example of displaying, and the process executed by the first display controller 210A in S80 is also an example of a first display process. The first display controller 210A is also an example of the display controller. After execution of S80, the process is terminated.

Process When Openable Cover is Opened

As another example of a case in which consumable handling information is displayed, an example of the process performed by the second display controller 210B of the controller 210 when the openable cover that opens and closes the cartridge holder 51 in MFP 200 is opened is described with reference to flowcharts shown in FIGS. 6 and 7. The processes shown in FIGS. 6 and 7 and the process shown in FIG. 4 are executed concurrently using a well-known method similar to the "multitasking" process often used in computer operating systems.

When the cover sensor 275 detects the open state of the openable cover (S110: YES), it is determined, as in S20, whether the MFP 200 is in the contract start state (i.e., Activated state) in S120. When the MFP 200 is not in the Activated state (S120: NO), a particular cover open screen (not shown) indicating that the openable cover is opened is displayed on the display 240 (S210), then the process is terminated.

When the MFP 200 is in the Activated state (S120: YES), the second display controller 210B obtains, as in S40, the arrival time information of the contract cartridge 50, which is stored in the arrival time information storage area 234 at this point of time (S130). S130 is an example of obtaining, a process the second display controller 210B performs is an example of a first obtaining process, and the second display controller 210B executing S130 is an example of an obtaining processor.

Based on the arrival time information obtained in S130, it is determined, as in S50, whether the contract cartridge 50 has arrived or not (S140). That is, the current time represented by the current time information of the timing measurement circuit 260 is compared with the arrival date and time represented by the arrival time information obtained in S130, and it is determined whether the current time is the same as the arrival date and time or has passed the arrival date and time. The arrival date and time is an example of the arrival time, determining whether or not the current time is the same as the arrival date and time or has passed the arrival date and time is an example of determining the arrival time, and the process executed by the second display controller 210B in S140 is an example of a second determination process.

When the contract cartridge 50 has arrived (S140: YES), the second display controller 210B obtains, as in S25, the cartridge model information of the ink cartridge 50 installed in the cartridge holder 51 (S145). The process executed by the second display controller 210B in S145 is an example of the second acquisition process. Then, based on the obtained cartridge model information, it is determined whether or not the contract cartridge 50 is installed in the cartridge holder 51 (S150). When the contract cartridge 50 is installed in the cartridge holder 51 (S150: YES), the second display controller 210B executes S120 and terminates the process. S150 is an example of determining, the process executed by the second display controller 210B in S150 is an example of a first determining process, and the second display controller 210B that executes S150 is an example of a determining section.

When the contract cartridge 50 is not installed (S150: NO), a guidance display is made, as in S70, on the display 240 to install the contract cartridge 50, or in other words, to replace the normal cartridge 50 in the cartridge holder 51 with the contract cartridge 50 (S160). The contents of the display 140, in this case, are the same as those shown in FIG. 5B. The contents displayed on the guidance screen 240B, in this case, is also an example of information for recommending replacement with the first consumable and is also an example of information related to handling consumables. S160 is also an example of displaying, and the process executed by the second display controller 210B is also an example of the first display process, and the second display controller 210B executing S160 is also an example of a display controller. When the user performs an appropriate confirmation operation in response to the above guidance display in S160, for example via the operation panel 250 (S170), the process is terminated through S210.

Figure 5C:
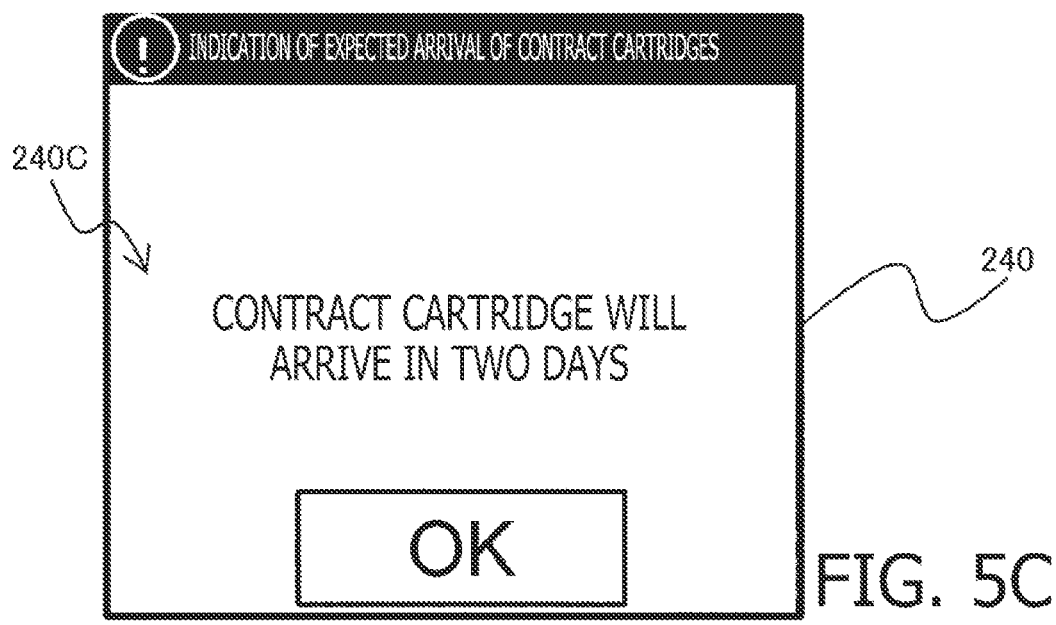

When the contract cartridge has not arrived (S140: NO), the second display controller 210B obtains, as in S25 and S145, the cartridge model information of the ink cartridge 50 installed in the cartridge holder 51 (S172). The process executed by the second display controller 210B in S172 is also an example of the second obtaining process. Then, based on the obtained cartridge model information, the second display controller 210 determines, as in S150, whether or not the contract cartridge 50 is installed in the cartridge holder 51 as in S150 (S175). S175 is also an example of determining, the process executed by the second display controller 210B in S175 is an example of the first determining process, and the second display controller 210B that executes S175 is an example of the determining part. When the contract cartridge 50 is installed (S140: YES), the scheduled arrival date and time of the next contract cartridge 50 is displayed on the display 240 based on the arrival time information obtained in S130 (S200). FIG. 5C shows the arrival schedule display screen 240C that is shown on the display 240 at this time. The content displayed on the arrival schedule display screen 240C is also an example of consumable handling related information, S200 is also an example of displaying, the process executed by the second display controller 210B in S200 is also an example of a first display process, and the second display controller 210B executing S200 is also an example of a display controller. When the user performs an appropriate confirmation operation for the above arrival schedule display in S200, for example, via the operation panel 250 (S205), the process is terminated.

When the contract cartridge 50 is not installed (S175: NO), the scheduled arrival date and time of the next contract cartridge 50 is displayed, as in S200, on the display 240 based on the arrival time information obtained in S130 (S180 in FIG. 7). The contents displayed on the display 240 at this time is the same as those shown in FIG. 5C, for example. In this case, the content displayed on the arrival schedule display screen 240C is also an example of consumable handling-related information corresponding to the arrival time being not yet reached. S180 is also an example of displaying. The process executed by the second display controller 210B in S180 is also an example of the first display process, and the second display controller 210B that executes S180 is also an example of a display controller.

When the user performs an appropriate confirmation operation in response to the above display in S180, for example, via the operation panel 250 (S190), the second display controller 210B obtains, as in S75, the usable amount information representing the usable amount of the ink in the normal cartridge 50 installed in the cartridge holder 51 at this time (S191). The process executed by the second display controller 210B in S191 is an example of the fourth obtaining process.

Figure 5D:
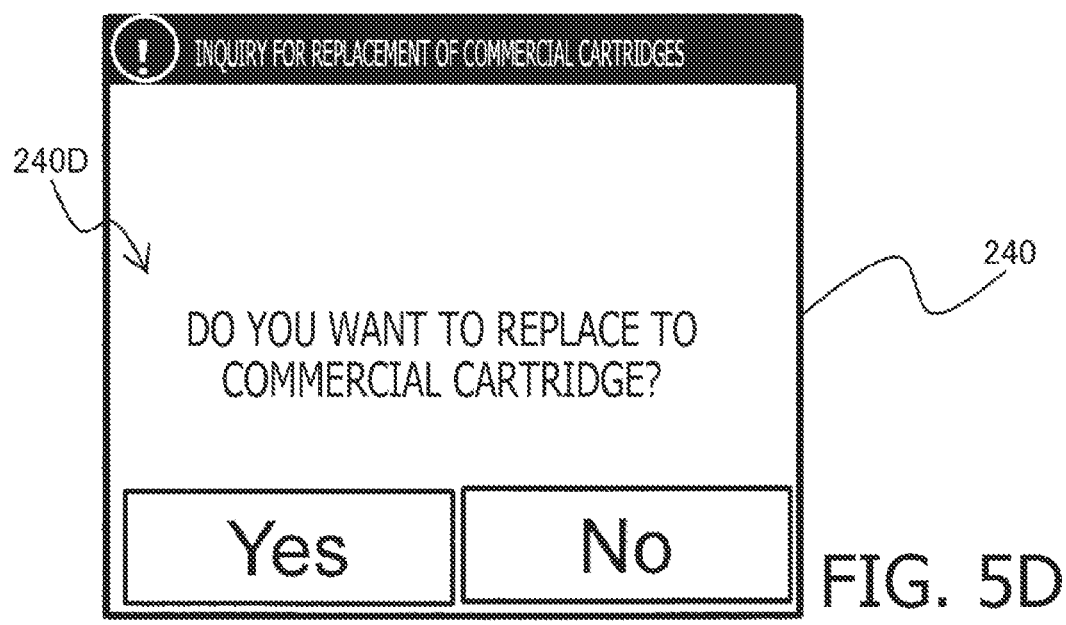

When the usable amount represented by the obtained usable amount information reaches the predetermined threshold corresponding to the Empty state where the ink is about to run out (S192: YES), a process to inquire the user whether or not to replace the cartridge with a new normal cartridge 50 is displayed on the display 240 (S193). FIG. 5D shows an inquiry screen 240D displayed on the display 240 at this time. The displayed contents on the inquiry screen 240D is an example of a replacement checking information, and is also the consumable handling related information. S193 is an example of displaying, the process executed by the second display controller 210B in S193 is an example of the first displaying process, and the second display controller 210B executing S194 is an example of the display controller.

Figure 8:
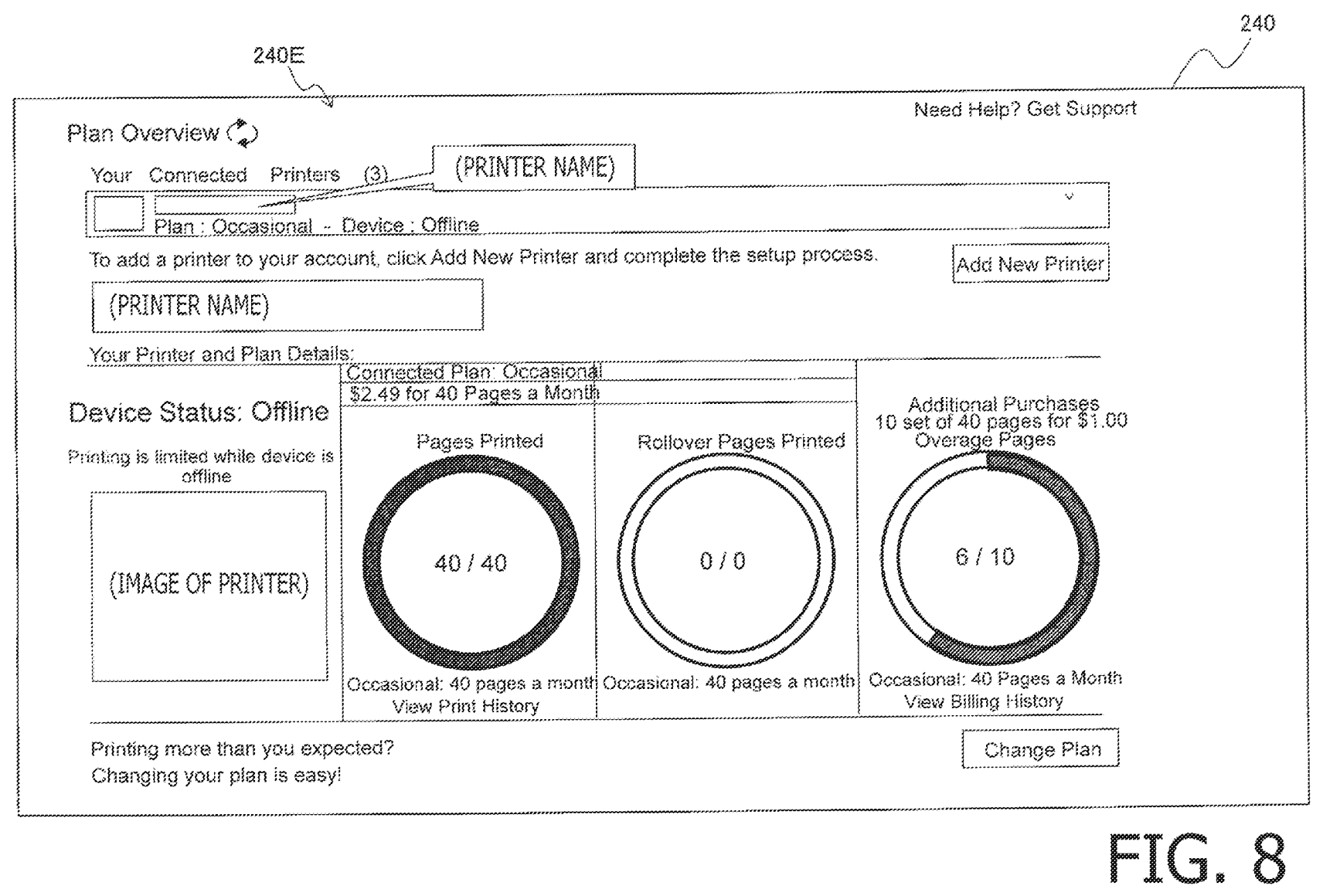

For example, when the "No" button of the inquiry screen 240D is operated by the operation of the operation panel 250 of the MFP 200 (S194: NO), the display of the particular specific information corresponding to the contract cartridge 50 is started on the display 240 (S195). FIG. 8 shows a specific information display screen 240E that is displayed on the display 240 at this time. As shown in FIG. 8E, the specific information display screen 240E displays the name and status information of the MFP 200, as well as the details of the contract that has been concluded, such as the fee, the print count method, and other options. These indications are originally displayed only when the contracted cartridge 50 corresponding to the above contract is installed in the cartridge holder 51, but in S195, they are exceptionally displayed because the contracted cartridge 50 has not yet been delivered even though the contract has been concluded. The contents displayed in this specific information display screen 240E is an example of specific information, and the process executed by the second display controller 210B in S195 is an example of the second display process.

After S195, based on the arrival time information already obtained in S130, the second display controller 210B determines whether the contract cartridge 50 has arrived or not (S196), as in S140, and when the contract cartridge 50 has arrived (S195: YES), the display of specific information on the display 240 started in S195 is terminated (S197), and the process returns to S160.

On the other hand, when, for example, the "No" button is operated in the above inquiry screen 240D (S194: YES), the open state of the openable cover is detected in the same way as in S110 (S198: YES), S210 of FIG. 6 is performed, and then the process is terminated.

Effects

As explained above, the MFP 200 according to the present embodiment has the cartridge holder 51, the print engine 290, the display 240 and the controller 210, and can operate based on the contents of the contract concluded with the contractor concerning the cartridge 50 used for printing in the print engine 290. In S40 and S130, the arrival time information of the contracted cartridges 50, which correspond to the content of the above contract, to be delivered to the MFP 200 is obtained. In S30, S150, and S175, the model of the cartridge 50 installed in the cartridge holder 51 is determined.

The consumable handling related information according to the above-obtained arrival time information of the contract cartridge 50 and the above determination results are displayed on the display 240 in S60, S70, S80, S160, S200, S180, and S193 (see also FIGS. 5A-5D).

According to the present embodiment, appropriate information can be provided to the user by displaying the information on the display 240 in accordance with the arrival time information corresponding to the delivery status of the contracted cartridge 50 after the conclusion of the contract and the above determination result related to the model of the installed cartridge 50.

Also, in this embodiment, the model information of the cartridge 50 installed in the cartridge holder 51 is obtained in S25, S145, S172. In S30, S150, and S175, the model of the cartridge 50 is determined based on the model information obtained in S25, S145, and S172.

According to the present embodiment, the model of the cartridge 50 can be reliably determined based on the model information obtained from the cartridge 50.

In the present embodiment, at S50 and S140, it is determined whether or not the time for the arrival of the contract cartridge 50 has arrived, or in other words, whether or not the contract cartridge 50 has arrived. When the arrival time has been reached, the consumable handling related information with the contents corresponding to the arrival of the contract cartridge 50 is displayed on the display 240 in S60, S70, S80, S160, S200, S180, and S193.

According to the present embodiment, when a commercial cartridge 50 has already been installed prior to the arrival of the contract cartridge 50, the usage confirmation information inquiring whether to continue using the currently installed cartridge 50 or not is displayed (S60, see FIG. 5A), while when a commercial cartridge 50 is newly installed after the arrival of the contract cartridge 50, the replacement recommendation information that the cartridge 50 should be replaced with the contract cartridge 50 is displayed (S70, S80, see FIG. 5B), thereby improving user convenience.

In the present embodiment, when it is determined that the normal cartridge 50 is installed in the cartridge holder 51 in S30, the usage confirmation information regarding whether or not the installed normal cartridge 50 can be continued to be used is displayed on the display 240 in S60 (see FIG. 5A).

According to the present embodiment, if the normal cartridge 50 has already been installed before the arrival of the contract cartridge 50, the usage confirmation information indicating whether or not to continue using the cartridge 50 is displayed, thereby improving user convenience.

In the present embodiment, when information to the effect of denial of continued use of the normal cartridge 50 from the user is obtained in response to the display of the usage confirmation information regarding whether or not to continue using the normal cartridge 50, the replacement recommendation information recommending replacement with the contract cartridge 50 is displayed on the display 240 in S70 (see FIG. 5B).

According to the present embodiment, by displaying replacement recommendation information that recommends replacement of normal cartridges 50 with the contract cartridges 50 upon arrival of the contract cartridges 50, user convenience can be improved.

In the present embodiment, when information to the effect that the user accepts the continued use of the normal cartridge 50 is obtained in response to the display of the usage confirmation information regarding whether or not the normal cartridge 50 can be continued to be used, the information on the usable amount of the ink in the normal cartridge 50 installed in the cartridge holder 51 is obtained, in S75, at any time. When the usable amount information reaches a predetermined threshold, the replacement recommendation information recommending replacement with the contract cartridge 50 is displayed on the display 240 in S80 (FIG. 5B).

According to the present embodiment, by respecting the intentions of the user who intends to continue using the normal cartridge 50 even after the arrival of the contract cartridge 50, and by displaying the replacement recommendation information that recommends replacement with the contract cartridge 50 at the stage where the continued use of the normal cartridge 50 is approximately completed, the convenience of the user can be improved.

In the present embodiment, when it is determined in S150 that a normal cartridge 50 is installed in the cartridge holder 51, the replacement recommendation information recommending replacement with a contract cartridge 50 is displayed on the display 240 in S160 (see FIG. 5B).

According to the present embodiment, when the normal cartridge 50 is installed even though the contracted cartridge 50 has already arrived, by displaying the recommended replacement information on the display 240 for alerting the user, the user convenience can be improved.

In the present embodiment, it is determined in S140 whether or not the arrival time of the contract cartridge 50 has reached, or in other words, whether or not the contract cartridge 50 has arrived. When the arrival time has not been reached, the consumable handling related information with the contents corresponding to the fact that the contract cartridge 50 has not arrived is displayed on the display 240 in S200, S180, or S193.

According to the present embodiment, by displaying, for example, the scheduled arrival information of when the contracted cartridge 50 is scheduled to arrive (see FIG. 5C), or by displaying the replacement confirmation information of when the commercial cartridge 50 will be installed and used up, and whether it will be replaced with yet another commercial cartridge 50 (see FIG. 5D), user convenience can be improved.

In the present embodiment, when it is determined that the time for the arrival of the contract cartridge 50 has not been reached, the replacement confirmation information that asks the user to confirm whether to replace the installed normal cartridge 50 with a new normal cartridge 50 is displayed on the display 240 in S193 (see FIG. 5D).

According to the present embodiment, when a normal cartridge 50 has already been installed and used before the arrival of the contracted cartridge 50, and when that normal cartridge 50 is to be discontinued, by displaying the replacement confirmation information that asks the user whether or not to install another normal cartridge 50 without waiting for the arrival of the contracted cartridge 50, the convenience of the user can be improved.

In the present embodiment, when the contract cartridge 50 has not arrived and the user has no choice but to install and use a normal cartridge 50 instead, the usable amount information indicating the usable amount of the ink in the normal cartridge 50 installed in the cartridge holder 51 is obtained in S191. When the usable amount information reaches the particular threshold, the specific information corresponding to the contracted cartridge 50 is displayed on the display 240 in S195.

When the contract is concluded, the user should be in a position to enjoy cost and other benefits by using the contracted cartridge 50. According to the present embodiment, in response to the fact that the user is not able to enjoy the benefits of the contracted cartridge 50 due to its non-arrival, the specific information, which is originally displayed only when the contracted cartridge 50 is used, is displayed to the user in S195, thereby providing some relief from the user's disadvantageous state.

In the present embodiment, in particular, S30 and S40 are performed when the power of the MFP 200 is turned on or when printing is completed by the print engine 290, and S130, S150, and S175 are performed when the openable cover is opened/closed, and the above consumable handling-related information is displayed in S60, S70, and S80, and in S160, S200, S180, and S193, respectively, based on the respective results.

According to the present embodiment, when the power is turned on with the intention of starting to use the MFP 200, when printing is completed, when the user opens and closes the openable cover with the intention of installing or replacing the cartridge 50, and the like, the display 240 displays the information according to the arrival time information and the determination result related to the model of the cartridge 50 to provide the user with appropriate information.

In the present embodiment, the arrival time information is sequentially written into the arrival time information storage area 234 and the storage content is updated by the update process of S45 shown in FIG. 4 in a particular cycle. Then, the updated arrival time information is read out from the arrival time information storage area 234 by S40 or S130, and based on the read contents, the consumable handling related information is displayed in S60, S70, S80, S160, S200, S180, or S193.

According to this embodiment, appropriate information can be provided to the user by displaying the information according to the determination results related to the model of the cartridge 50 and the arrival time information that is updated in a particular cycle.

In the present embodiment, in particular, the display of the above consumable handling related information in S60, S70, S80, S160, S200, S180, or S193 is performed based on the latest arrival time information stored in the arrival time information storage area 234 as shown in S44 to S48 of FIG. 4.

According to the present embodiment, even if the arrival time information based on S45 executed in the latest cycle cannot be obtained in S40 executed by the delivery checking controller 210C, the arrival time information based on S45 executed in the immediately preceding cycle can be obtained. By displaying the information according to the obtained arrival time information and the determination result related to the model of the cartridge 50, appropriate information can be provided to the user.

Modifications

Aspects of the present disclosures are not necessarily limited to the above-described configuration, but various modifications as described below are also included in aspects of the present disclosures.
(1) When Mobile Terminal Performs Main Process
In the above embodiment, the controller 210 of the MFP 200 is configured to perform all the processes shown in FIGS. 3, 4, 6, and 7, but the configuration can be modified such that a processor of the mobile terminal 300 may be configured to perform the main process.

For example, for each of the procedures in the process shown in FIG. 3, the determination in S10 and S20 should be performed by the processor of the mobile terminal 300 by obtaining the corresponding power ON/OFF information and activation information from the MFP 200. Acquisition of information in S25 and S75 can be performed by the processor of the mobile terminal 300 via the MFP 200, and the display in S60, S70, and S80 can be performed by the display device of the mobile terminal 300 based on the control of the processor. Furthermore, for the acquisition of arrival time information in S40, the processor of the mobile terminal 300 should execute the process described in each process of FIG. 4, store the obtained arrival time information in the storage device provided in the mobile terminal 300, and read and obtain the stored information in S40.

In this case, S30 in FIG. 3 is an example of determining, and the processor of the mobile terminal 300 that executes S30 is an example of a determining device. Further, S40 is an example of obtaining, and the processor of the mobile terminal 300 that executes S40 is an obtaining part. S60, S70, and S80 are examples of displaying, and the processor of the mobile terminal 300 that executes S60, S70, and S80 is an example of a display controller.

Figure 6:
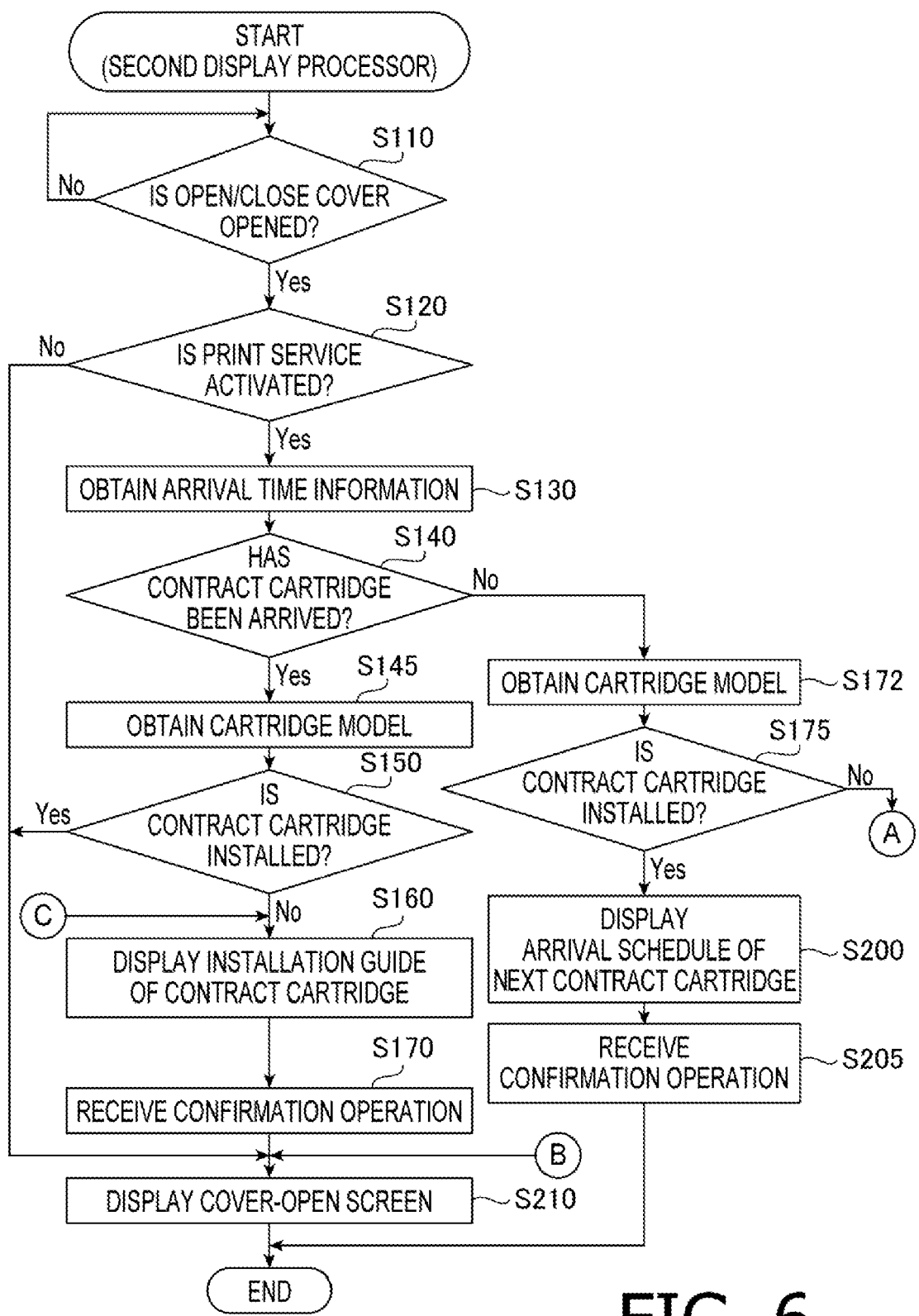
FIG. 6 shows a flowchart of a process performed by a second display controller of the processor provided to the MFP.
Figure 7:
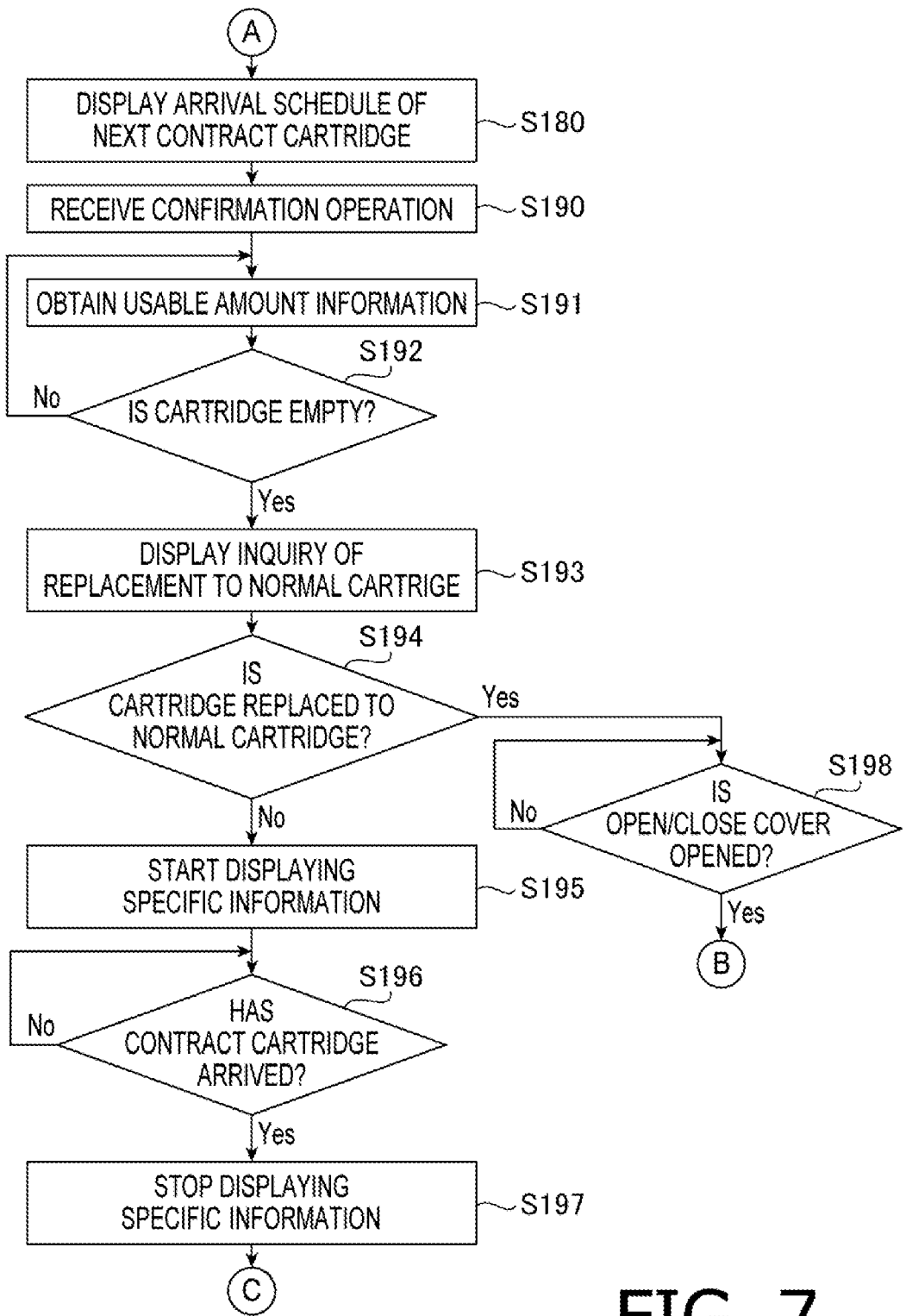
FIG. 7 shows a flowchart of a process performed by the second display controller of the processor provided to the MFP.

Similarly, for each of the processes shown in FIGS. 6 and 7, the decisions in S110 and S120 may be made by the processor of the mobile terminal 300 by obtaining the corresponding power ON/OFF information and the activation information from the MFP 200. The information acquisition in S145 and S191 may be performed by the processor of the mobile terminal 300 through the MFP 200, and the display in S160, S200, S180, and S193 may be performed by the display device of the mobile terminal 300 based on the control by the processor. Furthermore, for the acquisition of arrival time information in S130, the processor of the mobile terminal 300 may execute each process of the flowchart shown in FIG. 4, store the obtained arrival time information in the storage device provided in the mobile terminal 300, and read and acquire the stored information in S40.

In this case, S150 and S175 in FIG. 6 are examples of determining, and the processor of the mobile terminal 300 that executes S150 and S175 is an example of a determining device. S130 is an example of obtaining, and the processor of the mobile terminal 300 that executes S130 is an example of the acquisition device. S160, S200, S180, and S193 are examples of displaying, and the processor of the mobile terminal 300 that executes S160, S200, S180, and S193 is an example of a display controller.

(2) Others

In the above description, ink was taken as an example of consumables, and the remaining amount or the used amount of ink was taken as an example of the usable amount information, but the embodiment according to aspects of the present disclosure is not limited to this configuration. For example, when a laser MFP 200 is used instead of an inkjet printer, the toner may be treated as a consumable and the remaining amount or the used amount of the toner as usable quantity information, or the drum may be treated as a consumable and its remaining life as usable quantity information.

The sequence diagram and the flowcharts shown in FIG. 2, FIG. 3, FIG. 4, FIG. 6, and FIG. 7 do not limit the invention to the processes shown in the above drawings, but a process may be added to and/or deleted from the processes. Further, the order of processes and/or steps may be changed without departing from aspects of the present disclosures.

With respect to the components illustrated in the above embodiment, modifications and drawings, the shape, numerical value, or the structure or chronological interrelationship of multiple components may be arbitrarily modified and improved within aspects of the present disclosures.

In addition to the configurations described above, methods/components described in the above embodiment and each modification may be used in combination as appropriate.

The problems to be solved by the present disclosures and the effects of the present disclosures are not limited to those described above. In other words, the present disclosures may solve a problem not described above or produce an effect not described above, or may solve only a part of the problem described or produce only a part of the effect described.

The embodiment and modifications described above may be implemented with various other modifications without departing from aspects of the present disclosures.

What is claimed is:

1. A printing device, comprising:
   a mounting part to which consumables to be used for printing is mounted;
   a print engine configured to print an image on a recording medium using the consumables;
   a display configured to display information regarding the consumables; and
   a controller,
   wherein the printing device is operable based on a concluded contract with a contractor for the consumables used for printing, and
   wherein the controller is configured to perform:
      first determining whether a model of the consumables mounted to the mounting part is a contract model or a normal model, the contract model being a model of consumables contracted with the contractor, the normal model being a model of consumable not contracted with the contractor;
      first obtaining arrival time information of a first consumable delivered to the printing device based on the concluded contract when determining that the model of the consumables mounted to the mounting part is the normal model; and
      first displaying consumable handling related information on the display based on the arrival time information obtained in the first obtaining and a determining result in the first determining.

2. The printing device according to claim 1,
   wherein the controller is further configured to:
      second obtaining model information of the consumables mounted to the mounting part; and
      in the first determining, determining a model of the consumables based on the model information obtained in the second obtaining.

3. The printing device according to claim 1,
   wherein the controller is further configured to:
      second determining whether an arrival time corresponding to the arrival time information obtained in the first obtaining has been reached;
      in response to determining, in the second determining, that the arrival time has been reached, displaying the consumable handling related information corresponding to reaching of the arrival time on the display in the first displaying.

4. The printing device according to claim 3,
   wherein the controller is further configured to perform:
      when it is determined, in the first determining, that the consumable mounted to the mounting part is a second consumable different from the first consumable, displaying, in the first displaying, usage confirmation information regarding whether or not to continue using the second consumable on the display as the consumable handling related information.

5. The printing device according to claim 4, wherein the controller is further configured to perform:
displaying, in the first displaying, replacement recommendation information recommending a replacement to the first consumable as the consumable handling related information based on information indicating denial of continued usage input in response to the usage confirmation information on the display.

6. The printing device according to claim 4, wherein the controller is further configured to perform:
third obtaining usable amount information of the second consumable mounted to the mounting at a particular timing after information indicating acceptance of continued usage is input in response to the usage confirmation information, third obtaining; and
when the usable amount information obtained in the third obtaining has reached a particular threshold, displaying, in the first displaying, replacement recommendation information recommending a replacement to the first consumable as the consumable handling related information.

7. The printing device according to claim 3, wherein the controller is further configured to perform:
when, it is determined, in the first determining, that the consumable mounted to the mounting part is a second consumable different from the first consumable, displaying, in the first displaying, replacement recommendation information recommending a replacement to the first consumable as the consumable handling related information on the display.

8. The printing device according to claim 1, wherein the controller is further configured to perform:
second determining whether arrival time corresponding to the arrival time information obtained in the first obtaining has been reached; and
in response to determining, in the second determining, that the arrival time has not been reached, displaying the consumable handling related information corresponding to the arrival time not being reached on the display.

9. The printing device according to claim 8, wherein the controller is further configured to perform:
displaying, in the first displaying, replacement confirmation information regarding whether or not a second consumable, which is mounted to the mounting part and is different from the first consumable is to be replaced with a new second consumable on the display as the consumable handling related information.

10. The printing device according to claim 9, wherein the controller is further configured to perform:
in response to determining, in the first determining, that the consumable mounted to the mounting part is the second consumable, fourth obtaining usable amount information of the second consumable mounted to the mounting; and
when the usable amount information obtained in the fourth obtaining has reached a particular threshold value, second displaying specific information corresponding to the first consumable.

11. The printing device according to claim 1, wherein the controller is further configured to perform:
the first obtaining and the first determining at a timing of one of when opening or closing of a cover configured to open and close the mounting part is detected, when the printing device is powered on and when printing by the print engine is completed; and
the first displaying in accordance with the arrival time information obtained in the first obtaining and a determination result of the first determining.

12. The printing device according to claim 1, further comprising a storage configured to store information,
wherein the controller is further configured to perform:
writing and updating the arrival time information in the storage at every particular period;
obtaining, in the first obtaining, the arrival time information updated in the updating by reading from the storage; and
the first displaying in accordance with the obtained arrival time information and a determination result of the first determining.

13. The printing device according to claim 12, wherein the controller is further configured to perform:
obtaining, in the first obtaining, a latest one of the arrival time information stored in the storage; and
the first displaying based on the latest one of the arrival time information.

14. A printing system, comprising:
a printing device provided with a mounting part to which consumables to be used for printing is mounted and a print engine configured to print an image on a recording medium using the consumables;
an external device configured to be communicatively connected to the printing device,
a display configured to display information regarding the consumables;
a determining device configured to determine whether a model of the consumables mounted to the mounting part is a contract model or a normal model, the contract model being a model of consumables contracted with the contractor, the normal model being a model of consumable not contracted with the contractor;
first obtaining arrival time information of a first consumable delivered to the printing device based on the concluded contract when determining that the model of the consumables mounted to the mounting part is the normal model; and
a display controller configured to display consumable handling related information on the display based on the arrival time information obtained by the obtaining device and a determining result determined by the determining device.

15. The printing system according to claim 14, wherein the display and the display controller are provided to the external device, and
wherein the display controller of the external device is configured to display information on the display of the external device.

16. A printing method performed by a printing system having a printing device provided with a mounting part to which consumables to be used for printing is mounted and a print engine configured to print an image on a recording medium using the consumables, an external device configured to be communicatively connected to the printing device, the method comprising:
displaying information regarding the consumables;
determining whether a model of the consumables mounted to the mounting part is a contract model or a normal model, the contract model being a model of consumables contracted with the contractor, the normal model being a model of consumable not contracted with the contractor;

first obtaining arrival time information of a first consumable delivered to the printing device based on the concluded contract when determining that the model of the consumables mounted to the mounting part is the normal model; and displaying consumable handling related information on the display based on the arrival time information obtained by the obtaining and a determining result determined by the determining.

17. The printing method according to claim 16, wherein a display is provided to the external device, and wherein the displaying is executed by the external device.

\* \* \* \* \*